United States Patent [19]
Boehnlein et al.

[11] Patent Number: 5,946,904
[45] Date of Patent: Sep. 7, 1999

[54] EJECTOR RAMJET ENGINE

[76] Inventors: John J. Boehnlein, 22500-4 Jeffrey Mark Ct., Chatsworth, Calif. 91311; Joseph G. Bendot, 453 Avocado Pl., Camarillo, Calif. 93010-8410

[21] Appl. No.: 08/909,509

[22] Filed: Aug. 12, 1997

[51] Int. Cl.⁶ .................................................. F02K 7/12
[52] U.S. Cl. ........................................ 60/269; 60/270.1
[58] Field of Search ........................... 60/242, 257, 269, 60/270.1, 271

[56] References Cited

U.S. PATENT DOCUMENTS

| | | | |
|---|---|---|---|
| 2,663,142 | 12/1953 | Wilson | 60/269 |
| 2,995,893 | 8/1961 | Morris et al. | 60/270.1 |
| 3,143,856 | 8/1964 | Hausmann | 60/35.54 |
| 3,323,304 | 6/1967 | Llobet et al. | 60/269 |
| 3,367,350 | 2/1968 | Howland | 137/81.5 |
| 3,812,672 | 5/1974 | Escher | 60/244 |
| 3,998,050 | 12/1976 | Curran | 60/245 |
| 4,030,289 | 6/1977 | Kampe | 60/204 |
| 4,077,572 | 3/1978 | Fitzgerald | 239/265.17 |
| 4,202,172 | 5/1980 | Brunner | 60/245 |
| 4,257,224 | 3/1981 | Wygmanski et al. | 60/204 |
| 4,807,831 | 2/1989 | Brewer et al. | 244/117 |
| 4,845,941 | 7/1989 | Paul | 60/39.06 |
| 4,986,495 | 1/1991 | Stromath et al. | 244/117 |
| 5,129,227 | 7/1992 | Klees et al. | 60/264 |
| 5,135,184 | 8/1992 | Billing | 244/53 R |
| 5,327,721 | 7/1994 | Bulman | 60/269 |

OTHER PUBLICATIONS

Journal of Aircraft, vol. 9, No. 3, Mar. 1972, pp. 243–248, by Richard B. Fancher.
Experimental Investigation of a Stowable–Fueled Ejector Ramjet, AF Contract F33615–67–C–1907.
SAE Paper 851163a, 1995.
Study of Composite Propulsion Systems for Advanced Launch Vehicle Applications Report No. 25,194; Sep. 1966, vol. 6.
Low Cost Hypermixing Ejector Ramjet Program Air Force Systems Command, ARL–TR 75–0219, Jun. 1975.

*Primary Examiner*—Louis J. Casaregola
*Attorney, Agent, or Firm*—Dennis W. Beech

[57] ABSTRACT

The ejector ramjet engine is a propulsion duct having normal augmented ramjet elements of an inlet, mixer, diffuser, combustor and exit nozzle. At the upstream end of the mixer an injector assembly is mounted in the fluid flow path to form an ejector. The injector assembly has one or more injector rings which have alternatively offset injector exhaust nozzles or slots to direct fluid toward the engine internal wall or the engine longitudinal axis respectively to improve fluid mixing for use of a shorter mixer section. The supply of fluid to the injector exhaust nozzles may be by fuel flow pumps and other elements connected to injector chambers in the injector ring or by an injector combustor external to the mixer. A movable plug is mounted on the center body fairing to provide adjustment for varying velocity and pressure conditions within the engine over the operating environment. This velocity/pressure regulation results in increased engine thrust and specific impulse performance. The diffuser has guide vanes to allow more rapid diffusion of the fluid flow.

6 Claims, 4 Drawing Sheets

EJECTOR RAMJET ENGINE

BACKGROUND OF THE INVENTION

1. Field of the Invention

This invention relates to apparatus used to power flying vehicles such as aircraft, aerospacecraft, missiles and rockets. The improved engine apparatus provides a combination of ejector and ramjet elements to enable efficient engine performance over the velocity range of zero to hypersonic flight.

2. Description of Realted Art

There are currently disclosed in the literature many techniques for construction of ramjet engines and for use of injectors with ramjet engines to form an ejector to operate cooperatively with the ramjet cycle of the engine. However, no practical, operational ejector ramjet engine for engine operation from zero velocity to hypersonic flight appears to have been developed.

The ejector ramjet engine offers advantages relative to the conventional ramjet engine such as sea level static thrust and engine thrust at low level flight speeds. For a given flight condition the ejector ramjet can provide larger engine thrust than the conventional ramjet engine. This may be particularly advantageous during flight vehicle transonic acceleration and hypersonic flight conditions where ramjet thrust may not satisfy vehicle requirements. Improved combustor performance due to higher pressure and temperature levels in the combustor can also be achieved which allow combustor operation at higher flight altitudes than possible with a ramjet engine. The ejector ramjet also allows injection of excess oxidizer to enrich the oxidizer in combustion to further increase thrust.

Various methods for augmenting jet engines or ramjet engines have been proposed as typified by the disclosures in U.S. Pat. No. 5,129,227, granted Jul. 14, 1992 and U.S. Pat. No. 5,327,721, granted Jul. 12, 1994. In the case of U.S. Pat. No. 5,129,227, a fuel rich injectant is introduced into the mixing zone of a duct to form an ejector. The composition or equivalency ratio and the temperature of the injected gas is controlled to prevent combustion in the mixing duct. The velocity flow along the wall of the duct is also controlled by the structure of the injector to aid in preventing propagation upstream of the combustion from the combustor.

With regard to U.S. Pat. No. 5,327,721, a rather complex system to improve on the entrainment of fluid as disclosed in related art is presented. An injector is modulated to alternate the direction of the primary fluid jet in an ejector to entrain secondary fluid. The oscillation of the primary jet provides energy exchange between the primary and secondary fluids in the propulsion duct in a substantially non-viscous fashion.

Techniques for mixing fluids or hypermixing are exemplified by U.S. Pat. No. 4,257,224, granted Mar. 24, 1981 and in the article Journal of Aircraft, Vol. 9, No. 3, March 1972, Pgs. 243–248, by Richard B. Fancher, entitled "Low-Area Ratio, Thrust-Augmenting Ejectors". U.S. Pat. No. 4,257,224 presents a method and apparatus for improving the mixing of two fluids using an active element in the vicinity of the beginning of the mixing region. Oscillations are induced in the two fluids about an axis substantially normal to the mixing region flow axis.

The article by Fancher discusses various hypermixing techniques and includes the disclosure of an experimental ejector design and setup. The disclosed design uses a primary nozzle which is segmented into 24 elements 1½ inches long. Each element gives its exiting mass a velocity component normal to both the nozzle's major axis and the fluid flow axis; the direction of this lateral velocity component was alternated from element to element.

The present invention uses a combination of a ramjet engine having: a movable plug in the exit nozzle; an injector assembly having slot nozzles with alternating orientation relative to the longitudinal axis or fluid flow axis of the engine and located at the upstream end of the mixing section; and provision to allow an external or internal, relative to the ramjet engine, combustion chamber to create the gas for the injector assembly. For the ejector ramjet engine to function with vehicles that operate over a velocity range of zero to hypersonic, a liquid air cycle process may be used with the injectors that uses the cooling properties of liquid hydrogen stored on the vehicle to liquefy environmental air as the oxidizer for the injector combustion chamber. By storing excess liquid air it can be used to augment the air flow received in the inlet when the altitude of the vehicle is such that the air flow received at the inlet is not of sufficient pressure to support combustion in the combustor.

SUMMARY OF THE INVENTION

A primary objective of the present invention is an apparatus for an ejector ramjet engine to operate over the range of velocities from zero to hypersonic. A further object is for the ejector ramjet engine to operate from altitudes of sea level to 150,000 feet.

In accordance with the description presented herein, other objectives of this invention will become apparent when the description and drawings are reviewed.

DESCRIPTION OF THE PREFERRED EMBODIMENT

The ejector ramjet engine is an augmented ramjet engine as commonly understood as having inlet, mixer, diffuser, combustor and exit nozzle elements or sections integrally connected in the order presented from inlet to exit nozzle. The engine may be of any shape to facilitate vehicle mounting and performance of each elements function in the engine operational cycle. As described in the preferred embodiment a circular cross-section engine is assumed with a rectangular inlet fairing. An annular injector structure having injector chambers therein is mounted in the upstream end of the mixer section normal to the engine longitudinal axis to form an ejector element. The injector ring element may be connected to an injector combustor or hot gas generator external to the mixer which produces gas for injection through injector nozzles or slots in the injector ring into the mixer.

The injectors for supply of fuel to the combustor section are located in the downstream end of the guide vanes mounted in the diffuser section. The guide vanes aid in faster expansion of the gas flow through the diffuser element without fluid separation from diffuser surfaces. A movable plug is mounted on the center body fairing to allow axial adjustment to define the combustor exit and exit nozzle areas relative to the choke constriction point. The movable plug controls pressure conditions upstream in the engine to adjust the location of the inlet normal shock to aid in proper operation and combustion in the engine and defines the choke minimum point flow area. The methodology of control allows the required area and normal shock location to be optimized to improve performance and available thrust.

Figure 1:
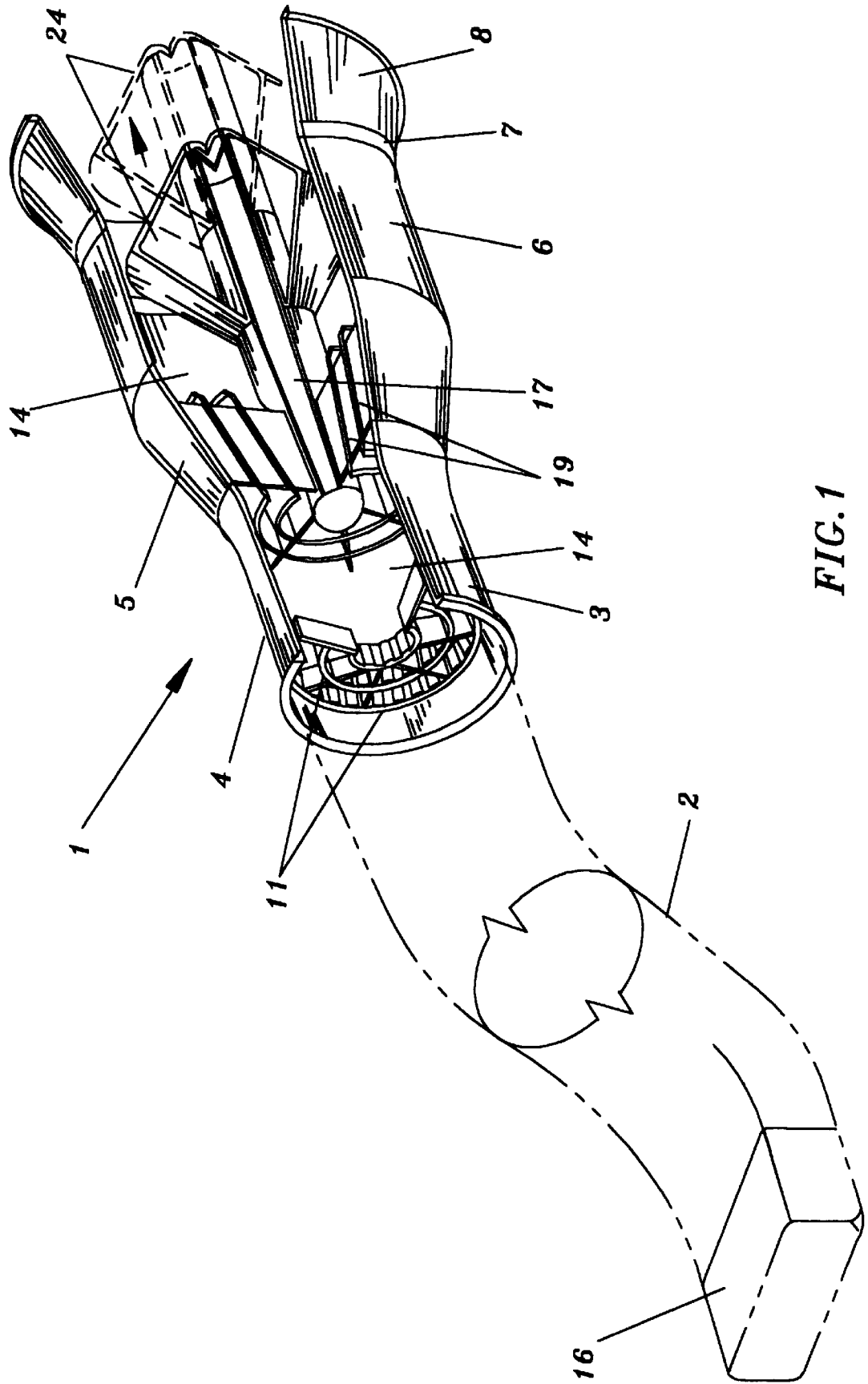
FIG. 1 illustrates a perspective view of the ejector ramjet engine fluid flow stream major elements sectioned to show internal structure and with an external vehicle mounted offset inlet.
Figure 2:
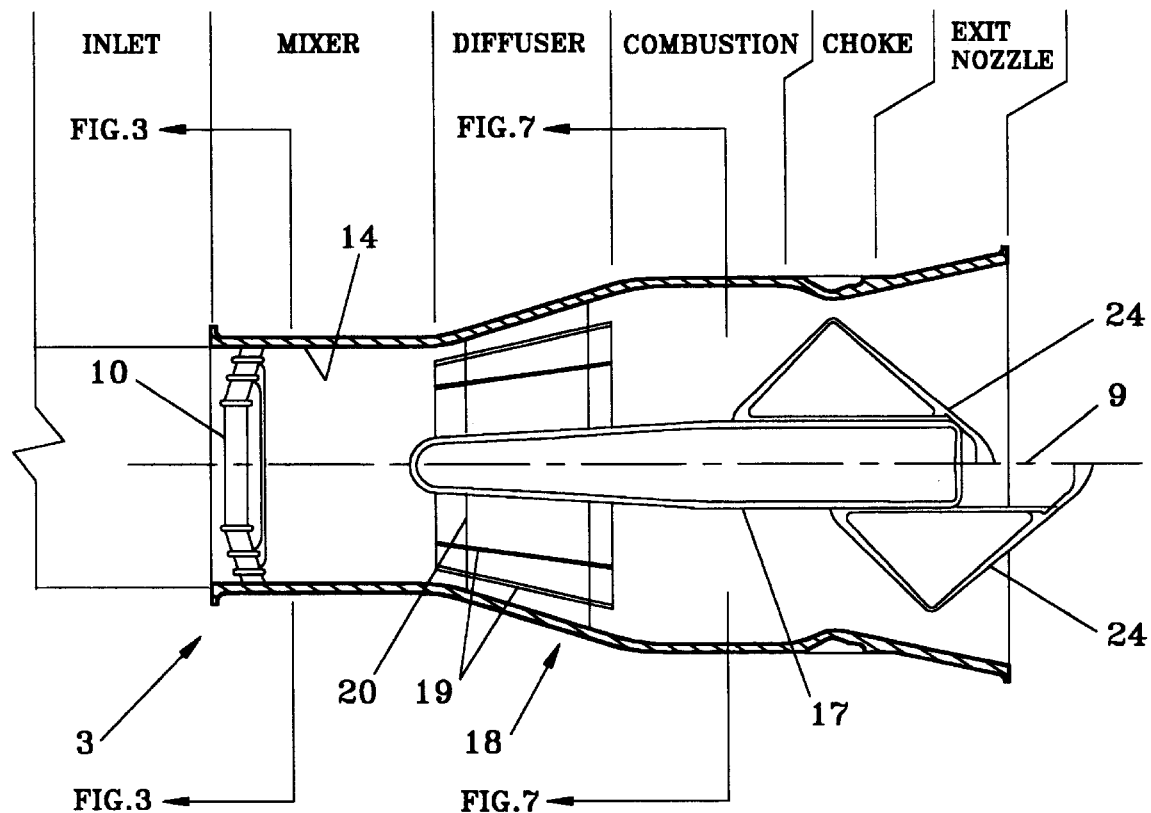
FIG. 2 illustrates a schematic sectional view of the ejector ramjet engine with truncated inlet.
Figure 3:
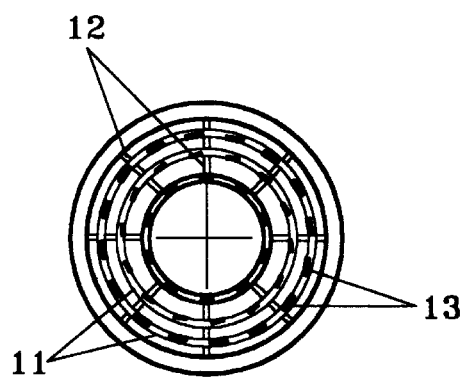
FIG. 3 illustrates a plan view of a multiple ring injector structure with injector exhaust nozzles as slots.

Referring to FIGS. 1 through 3, the ejector ramjet engine (1) has an inlet (2), mixer (4) including an ejector (3), diffuser (5), combustor (6), choke constriction point (7) and exit nozzle (8) section or element integrally connected along the longitudinal or fluid flow axis. In the preferred embodiment the elements are generally symmetrical about the engine longitudinal axis (9). However, depending on the mounting of the ejector ramjet engine (1) in a particular vehicle structure, elements such as the exit nozzle (8) may be canted, curved or bent relative to the other elements in order to direct the exhaust flow. For a typical ejector ramjet engine (1) there would be stiffening rings, flanges and intercostals outside the fluid flow path in a single wall axisymmetric structural design to provide the necessary rigidity to handle structural forces and to mount the engine in a vehicle. Depending on the operating environment and time of engine operation, cooling of engine elements and insulating film on inside or outside engine walls might be required. For example the combustor (6) and choke constriction point (7) might have cooling means, such as, the engine wall may have areas through which fuel as liquid hydrogen can be cycled for cooling the engine and also to warm the fuel to enhance combustion.

Figure 4:
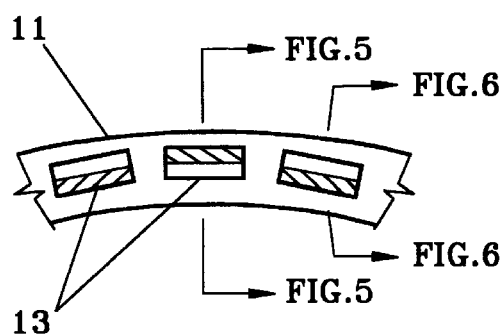
FIG. 4 illustrates a portion of the injector ring with injector exhaust nozzle alternatingly offset or canted relative to the major fluid flow axis.
Figure 5:
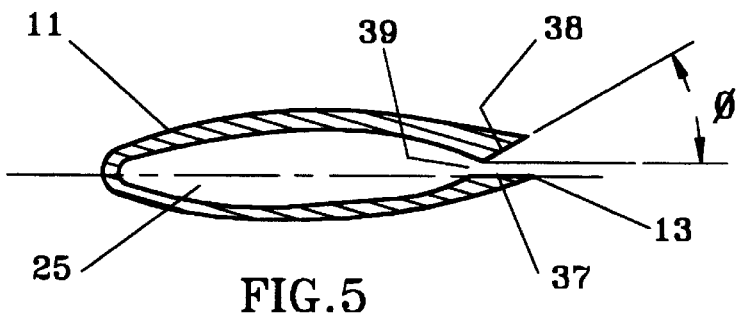
FIG. 5 illustrates a cross-section of the injector ring with injector chamber and the injector exhaust nozzle canted away from the mixer centerline.
Figure 6:
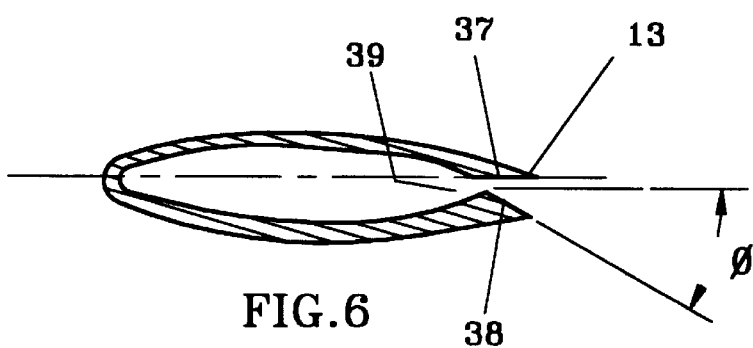
FIG. 6 illustrates a cross section of the injector ring with injector chamber and the injector exhaust nozzle canted toward the mixer centerline.
Figure 7:
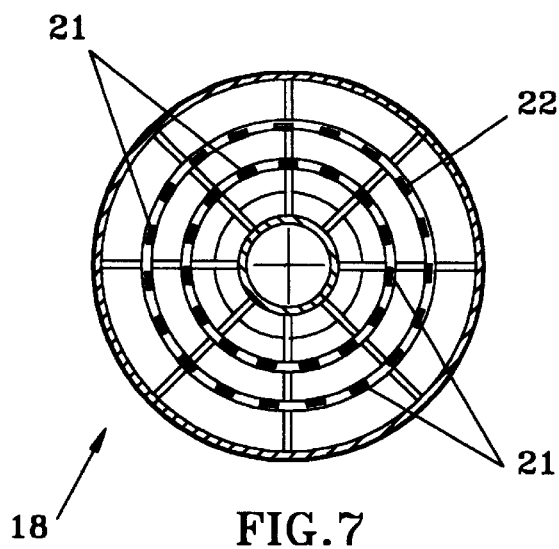
FIG. 7 illustrates a plan view of the diffuser guide vane assembly with fuel injectors.

The ejector (3) area of the mixer (4) section has an injector assembly (10) with one or more injector rings (11) mounted in the fluid flow stream supported by struts (12). The injector rings (11) may be a streamlined hollow tube with injector exhaust nozzles (13) or slots formed therein; however, the injector ring (11) is preferably an annular assembly with an aerodynamic cross section having injector chambers (25) spaced around the injector ring (11) as illustrated in FIGS. 4 through 6. The injector exhaust nozzles (13) are oriented to direct fluid release in the downstream flow direction partially offset from the engine longitudinal air flow axis. Also, the injector exhaust nozzles (13) are structured in an alternating pattern relative to each other at an angle offset or canted from parallel to the engine longitudinal axis (9) as illustrated in FIGS. 4 through 6.

Referring to FIGS. 2 through 6, in one experiment the injector exhaust nozzles (13) were formed as slots wherein adjacent slots longitudinal axis were oriented at an angle 15 degrees radially away from and toward the engine longitudinal axis (9) in an alternating pattern. The slot is formed such that the injector exhaust nozzle (13) has an exit nozzle face (37) parallel to the engine longitudinal axis (9) and an offset exit nozzle face (38) and the slot creates a throat (39) of desired opening size for the ejector (3) operation. This provides for a velocity component in the exiting exhaust gas normal to the engine longitudinal axis (9) and inlet (2) fluid flow. This causes injection of fluid from adjacent nozzles directed alternately toward the mixer (4) section engine internal wall (14) and the engine longitudinal axis (9). The offset of the injector exhaust nozzles (13) in an alternating pattern provides for more rapid mixing of the injector ring (11) introduced fluid with the entrained or velocity induced air from the inlet (2) section. This allows a much shorter mixer (4) section in the ejector ramjet engine (1). In the particular experiment conducted, one injector ring (11) was used with a mixer (4) length of 13 inches and a diameter of 8 inches thus allowing for a significantly reduced length engine. In this experiment the injector combustor (15) or hot gas generator was external to the mixer (4) section with the combustion gases ducted to the injector ring (11) to be exhausted through injector exhaust nozzles (13) or slots therein, reference FIG. 10.

Figure 8:
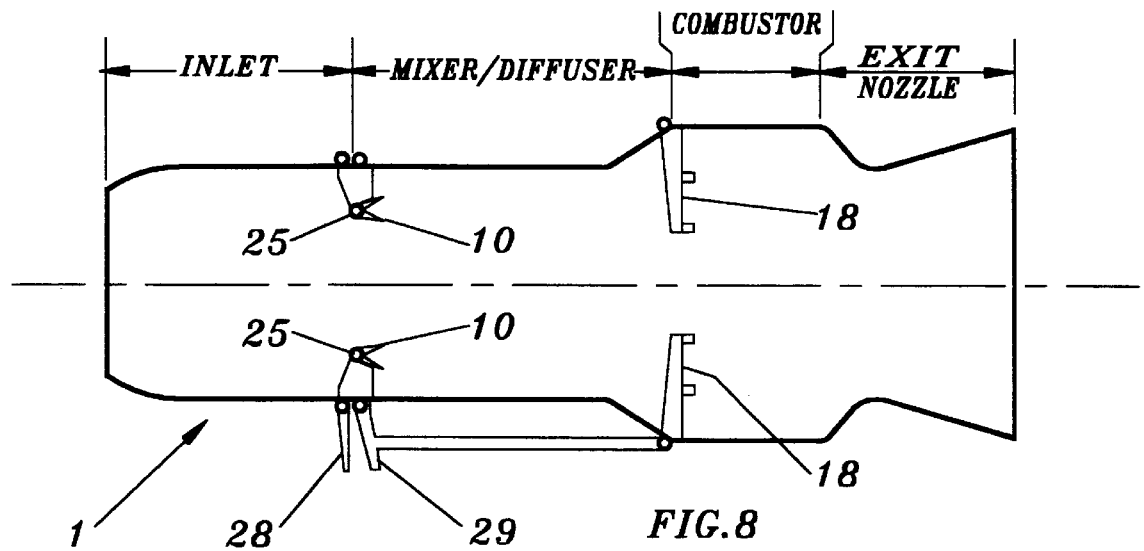
FIG. 8 illustrates a schematic of the invention with an ejector hot gas generator integrally contained in the injector assembly.
Figure 10:
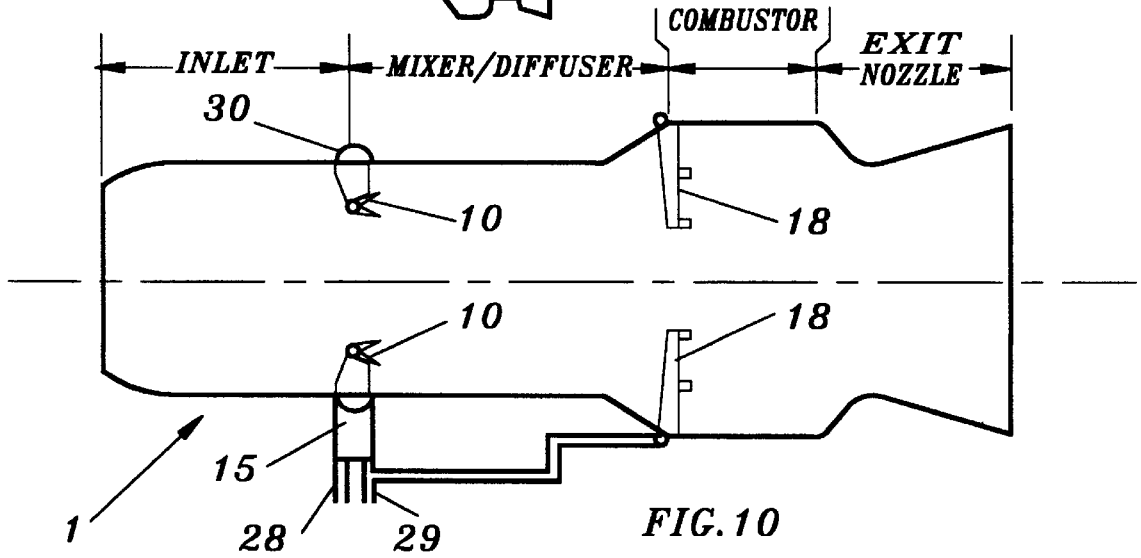
FIG. 10 illustrates a schematic of the invention with an ejector hot gas generator located external to the injector assembly and the hot gas ducted into the injector chamber.

Referring to FIGS. 8 and 10 to create an energetic gas jet at the injector assembly (10) it may be connected to any fluid source to supply fluid to create a jet at the injector exhaust nozzles (13) for the ejector (3) operation to entrain air for sufficient fluid flow to mix with fuel in the combustor (6) for efficient operation of the ejector ramjet engine (1). In normal operation a fuel such as hydrogen and an oxidizer such as air may be stoichiometrically used in an injector combustor (15) external to the ejector ramjet engine (1) to create a pressurized energetic gas stream to be routed by gas ducts (30) to the injector assembly (10) or the combustion may occur internal to the injector assembly (10) in fuel and oxidizer supplied injector chambers (25).

Figure 9:
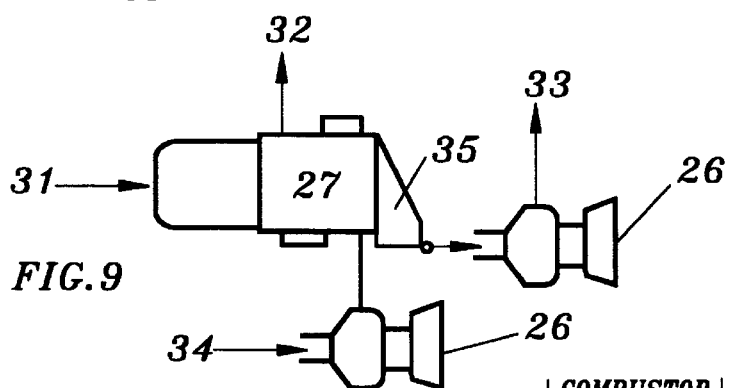
FIG. 9 illustrates a method to utilize the latent heat of the fuel, liquid hydrogen, to generate an oxidizer, liquid air.

Referring to FIG. 9, liquid hydrogen may be stored on the vehicle in which the ejector ramjet engine (1) is mounted. To provide for a more efficient performance vehicle, the air may be obtained from the environment. The liquid hydrogen may be used in a heat exchanger system (36) to liquefy air for temporary storage and use while the vehicle is operating rather than requiring handling and storage of a large quantity of liquid air or other oxidizer on the vehicle prior to operation. The heat exchanger system (36) receives liquid hydrogen (34) or fuel from the vehicle fuel tank at fuel pump (26) which supplies pressurized fuel to the air liquefaction unit (27). Air is collected by an air liquefaction inlet (31) and ducted into the air liquefaction unit (27) where it is condensed and collected in a sump. A sump pump (35) increases pressure and causes discharge of the liquid air (33) into a storage tank or into the engine liquid air supply inlet (28). The hydrogen discharge (32) is normally supplied to the engine fuel supply inlet (29).

Referring to FIGS. 1 and 2, the ejector ramjet engine (1) has an inlet fairing (16) and inlet (2) for proper inlet geometry over the operating range which may include the vehicle airframe structure for conditioning inlet air. A center body fairing (17) is provided for diffuser (5), combustor (6) and exit nozzle (8) to enhance performance although the extent to which it extends into the diffuser (5) depends on the application. To promote rapid fluid flow expansion in the diffuser (5) a guide vane assembly (18) may be used. The guide vane assembly (18) is comprised of one or more conical cylindrical guide vanes (19) axially mounted in the fluid flow path in the diffuser (5) section and retained by vane struts (20). In this embodiment the fuel injectors (21) may be fuel nozzles (22) in the downstream end (23) of the guide vanes (19). The fuel nozzles (22) may inject fuel parallel to the engine longitudinal axis (9) or may be alternately offset to promote mixing of fluids as previously discussed for the injector exhaust nozzles (13).

To further provide for efficiency in mixing and combustion, a movable plug (24) is mounted on the center body fairing (17) with a means to control or allow adjustment of the position of the movable plug (24) by a rod connected to a piston (not shown) in the center body fairing (17) which position is controlled by an engine performance monitor system for control longitudinally along the engine longitudinal axis (9). As the movable plug (24) is adjusted relative to the choke constriction point (7) the area of the combustor (6) section is changed and the cross-sectional area and location of the choke minimum flow area point is varied to control the aerodynamic location of the shock. Obviously the geometry of the exit nozzle (8) is varied as well. In FIG. 2 the movable plug (24) is illustrated split to show two positions. The movable plug (24) is one method to provide variable geometry conditions to control the location of the nozzle throat minimum flow area point, which also adjusts the aerodynamic location of the inlet normal shock, internal engine velocity and pressure depending on the operating environment of the ejector ramjet engine (1). Typically the movable plug (24) will be cooled by routing fuel, such as, liquid hydrogen, through cooling passages in the movable nozzle (24) prior to injecting the fuel into the combustor (6). Use of a variable choke area exit nozzle (8) permits engine operation at maximum inlet (2) performance and for high performance permits the mixer (4) exit Mach number to approach but not reach sonic velocity. Use of the variable choke exit nozzle (8) ensures local choking will not occur in the mixer (4) or diffuser (5).

We claim:

1. An ejector ramjet engine suitable for use with a flying vehicle in a range of speeds from zero to hypersonic flight comprising:
   a) an inlet of relatively small cross section area attached to a mixer located downstream therefrom;
   b) the mixer having an injector assembly mounted in the fluid flow zone of the mixer near the intersection with the inlet to form an ejector and a fluid supply system connected to the injector assembly wherein the injector assembly comprises an injector ring having a plurality of injector exhaust nozzles defined therein with the injector exhaust nozzles oriented to direct fluid release in the downstream flow direction partially offset from the engine longitudinal axis wherein adjacent injector exhaust nozzles are alternatively offset radially at an angle away from and toward respectively the engine longitudinal axis and the injector ring supported by a plurality of support means attached to an engine internal wall;
   c) a diffuser having an expanding cross sectional area relative to the mixer attached downstream of the mixer;
   d) a combustor having a larger cross sectional area relative to the mixer attached downstream of the diffuser and a fuel supply system connected to the combustor;
   e) an exit nozzle having an expanding cross sectional area relative to the combustor attached downstream of the combustor with a choke constriction point intermediate the combustor and the exit nozzle; and
   f) a center body fairing axially mounted along the engine longitudinal axis in the combustor and the exit nozzle and having a variable exit nozzle control system mounted thereon.

2. The ejector ramjet engine as in claim 1 wherein the injector exhaust nozzles having a slot configuration with an exit nozzle face and offset exit nozzle face defining a throat therein.

3. An ejector ramjet engine suitable for use with a flying vehicle in a range of speeds from zero to hypersonic flight comprising:
   a) an inlet of relatively small cross section area attached to a mixer located downstream therefrom;
   b) the mixer having an injector assembly mounted in the fluid flow zone of the mixer near the intersection with the inlet to form an ejector and a fluid supply system connected to the injector assembly;
   c) a diffuser having an expanding cross sectional area relative to the mixer attached downstream of the mixer;
   d) a combustor having a larger cross sectional area relative to the mixer attached downstream of the diffuser and a fuel supply system connected to the combustor wherein the fluid supply system is an injector combustor positioned external to the ejector;
   e) an exit nozzle having an expanding cross sectional area relative to the combustor attached downstream of the combustor with a choke constriction point intermediate the combustor and the exit nozzle; and
   f) a center body fairing axially mounted along the engine longitudinal axis in the combustor and the exit nozzle and having a variable exit nozzle control system mounted thereon.

4. An ejector ramjet engine suitable for use with a flying vehicle in a range of speeds from zero to hypersonic flight comprising:
   a) an inlet of relatively small cross section area attached to a mixer located downstream therefrom;
   b) the mixer having an injector assembly mounted in the fluid flow zone of the mixer near the intersection with the inlet to form an ejector and a fluid supply system connected to the injector assembly wherein the injector assembly comprises an injector ring having therein a plurality of injector chambers each connected to an injector exhaust nozzle, the injector ring supported by a plurality of struts attached to an engine internal wall and the fluid supply system is a fuel and oxidizer fluid supply; and the injector exhaust nozzles are oriented to direct fluid release in the downstream flow direction partially offset from the engine longitudinal axis with adjacent injector exhaust nozzles alternatively offset radially at an angle away from and toward respectively the engine longitudinal axis;
   c) a diffuser having an expanding cross sectional area relative to the mixer attached downstream of the mixer;
   d) a combustor having a larger cross sectional area relative to the mixer attached downstream of the diffuser and a fuel supply system connected to the combustor;
   e) an exit nozzle having an expanding cross sectional area relative to the combustor attached downstream of the combustor with a choke constriction point intermediate the combustor and the exit nozzle; and
   f) a center body fairing axially mounted along the engine longitudinal axis in the combustor and the exit nozzle and having a variable exit nozzle control system mounted thereon.

5. An ejector ramjet engine suitable for use with a flying vehicle in a range of speeds from zero to hypersonic flight comprising:

a) an inlet of relatively small cross section area attached to a mixer located downstream therefrom;

b) the mixer having an injector assembly mounted in the fluid flow zone of the mixer near the intersection with the inlet to form an ejector and a fluid supply system connected to the injector assembly;

c) a diffuser having an expanding cross sectional area relative to the mixer attached downstream of the mixer;

d) a combustor having a larger cross sectional area relative to the mixer attached downstream of the diffuser and a fuel supply system connected to the combustor;

e) an exit nozzle having an expanding cross sectional area relative to the combustor attached downstream of the combustor with a choke constriction point intermediate the combustor and the exit nozzle;

f) a center body fairing axially mounted along the engine longitudinal axis in the combustor and the exit nozzle and having a variable exit nozzle control system mounted thereon; and g) a guide vane assembly comprised of a guide vane supported by a plurality of vane struts attached to an engine internal wall and the center body fairing extended into the diffuser mounted in the fluid flow zone of the diffuser and the fuel supply system is the guide vane downstream end having a plurality of fuel nozzles defined therein with the fuel nozzles connected to a fuel source.

6. The ejector ramjet engine as in claim 4 wherein the injector exhaust nozzles having a slot configuration with an exit nozzle face and offset exit nozzle face defining a throat therein.

* * * * *